July 4, 1967 A. R. PEARLMAN ETAL 3,329,836

TEMPERATURE COMPENSATED LOGARITHMIC AMPLIFIER

Filed June 2, 1965

INVENTORS
WILLIAM D. MILLER
ALAN R. PEARLMAN

BY

Robert J. Schiller
ATTORNEY

United States Patent Office 3,329,836

Patented July 4, 1967

3,329,836
TEMPERATURE COMPENSATED LOGARITHMIC AMPLIFIER

Alan R. Pearlman, Newton, and William D. Miller, Brighton, Mass., assignors to Nexus Research Laboratories, Inc., Canton, Mass., a corporation of Massachusetts Filed June 2, 1965, Ser. No. 460,719
10 Claims. (Cl. 307—88.5)

Figure 1:
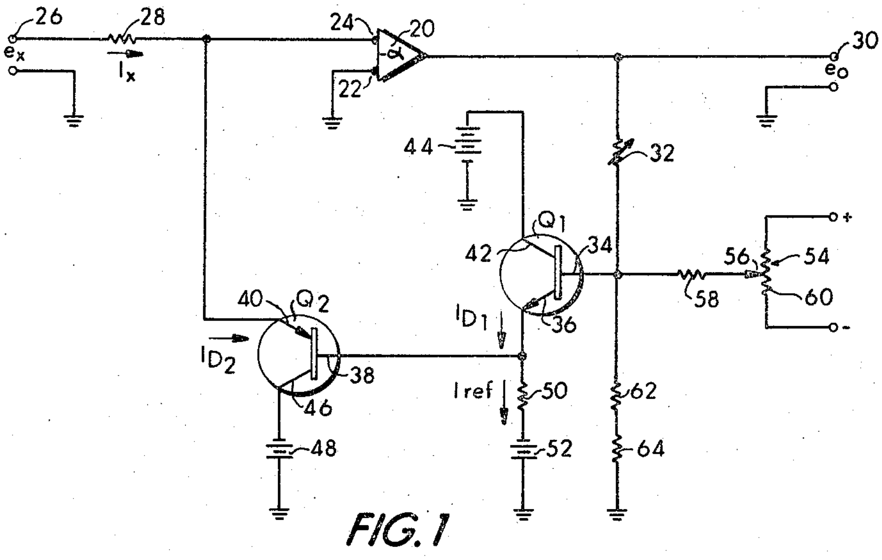

This application relates to electronic amplifiers, and more particularly to amplifiers having input and output signals related logarithmically.

It is known that, in a number of semiconductor devices having diode junctions, the voltage $V_D$ across the junctions is approximately equal to a function of the logarithm of the forward current $I_D$ through the junction, i.e., the change in forward current with voltage is exponential. This non-linear behaviour of the transfer function of the junction has formed the basis for operational amplifier-diode junction circuits having output and input logarithmically related, and a number of such circuits are discussed in The Review of Scientific Instruments, vol. 34, No. 12, December 1963, p. 1311 by W. L. Paterson. However, this transfer function is markedly temperature sensitive. The relationship of the diode forward current $I_D$ to the junction voltage, $V_D$ can be expressed, at least over a limited temperature range, as (1) $$V_D=V_O+a \log_{10}\frac{I_D}{I_O}+b(T_A-T_O)$$

where $V_O$ is the junction voltage measured at a given reference current $I_O$ and reference temperature $T_O$, $a$ is a logarithmic coefficient, $b$ is the temperature coefficient, and $T_A$ is the actual junction temperature.

In a typical silicon transistor, $b\approx 2$ mv./° C. Between about ±55° C., $a$ varies positively approximately 0.3%/° C. The relationship set forth in Equation 1 is valid substantially only where $I_D$ is appreciably greater than the bulk-saturation current of the junction. It will be apparent that the function described in Equation 1 is substantially a straight line when plotted as a semilogarithmic graph.

A principal object of the present invention is to provide a temperature-compensated log-linear circuit.

Other objects of the present invention are to provide a simple and relatively inexpensive log-linear amplifier circuit formed substantially of an operational amplifier having a feedback loop including a series pair of semiconductor junctions; to provide such a circuit which includes means for compensating the circuit such that an increment of temperature within a predetermined range of temperatures causes substantially no transformation of the transfer function of the circuit; and to provide such a circuit which is compensated for temperature variability of both coefficients $a$ and $b$ of the equations describing the diode junctions.

Yet another principal object of the present invention is to provide a temperature-compensated circuit of the type described including means for arbitrarily transforming the coordinates of the transfer function both in translation and in rotation.

Other objects of the invention will in part be obvious and will in part appear hereinafter. The invention accordingly comprises the apparatus possessing the construction, combination of elements, and arrangement of parts which are exemplified in the following detailed disclosure, and the scope of the application of which will be indicated in the claims.

Figure 2:
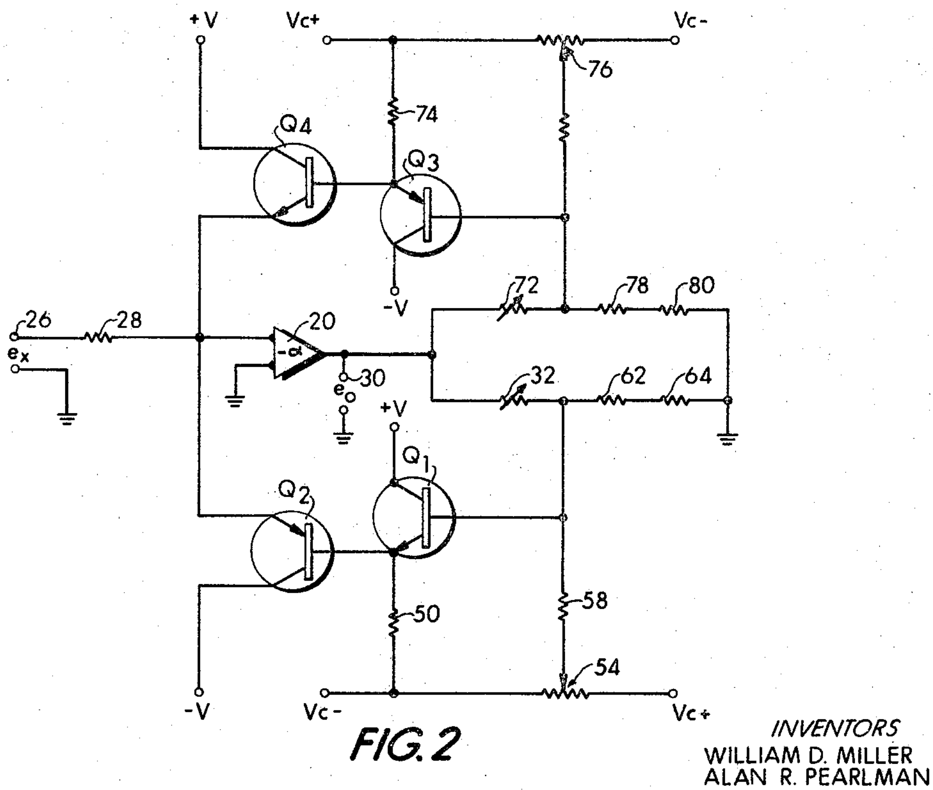

For a fuller understanding of the nature and objects of the present invention, reference should be had to the following detailed description taken in connection with the accompanying drawing wherein, like numerals denoting like parts:

FIG. 1 is a schematic diagram of a circuit embodying the principles of the present invention; and FIG. 2 is a schematic diagram of another embodiment of the present invention adapted to accept a bipolar input.

Referring now to FIG. 1, there will be seen a preferred embodiment of the present invention which uses transistor means to overcome the limitations of diodes as log converters, and which also employs an operational amplifier to achieve proper operating conditions. Thus, the circuit of FIG. 1 includes the usual, high-gain (e.g. >1000), DC, inverting amplifier 20 having a pair of input terminals 22 and 24, the former being connected to ground. Terminal 24 is connected to system input terminal 26 through input resistor 28. Amplifier 20 also includes output terminal 30 which is coupled to input terminal or summing junction 24 through a feedback path.

To provide the feedback path, output terminal 30 is connected through feedback resistor 32 to the base-emitter junction of three-terminal junction transistor Q1 as by being connected to base 34. In turn, emitter 36 of transistor Q1 is connected to the base-emitter junction of three terminal junction transistor Q2, as by connection to base 38 of the latter. The two transistors are of opposite conductivity type, transistor Q1 being a npn type and transistor Q2 being pnp. Emitter 40 of transistor Q2 is connected to summing junction 24 to complete the feedback path. Both transistors Q1 and Q2 are selected or matched, as described hereinafter, with respect to the coefficients $a$ and $b$. However, as will be apparent, the change in the $V_{eb}$ of each with respect to an increment of forward current need not be matched and can be quite different.

Collector 42 of transistor Q1 is connected to an appropriately poled bias source such as one side of battery 44, the other side of the battery being grounded. Similarly, collector 46 of transistor Q2 is connected to one terminal of battery 48, the other terminal of battery 48 being grounded.

The circuit of FIG. 1 also includes means providing a fixed reference current to transistor Q1 and, for example comprises resistor 50 connected at one end to emitter 36 of transistor Q1 and base 38 of transistor Q2. Resistor 50 is connected at its other end to voltage source or battery 52. Means are further provided for applying a predetermined level of voltage, independent of amplifier 20, to the base of transistor Q1 and for providing a compensating voltage to correct for the temperature variability of the coefficient $a$. To this end, there is included a passive network comprising potentiometer 54 having contact 56 connected through resistor 58 to base 34 of transistor Q1 and adjustably connected to resistance element 60, the latter being coupled between the usual two terminals at which respective opposite polarities of potential are established. Base 34 is also connected through series resistors 62 and 64 respectively to ground.

Both transistors Q1 and Q2 are positioned to be exposed to the same thermal environment substantially simultaneously as by being mounted closely adjacent one another on a common heat sink, or by being encapsulated adjacent one another in a highly heat conductive plastic or the like. Thus, transistors Q1 and Q2 are operated at substantially the same temperature, and in accordance with Equation 1 the emitter-base voltages are closely described respectively as follows:

(2) $$V_{eb1}\approx V_{01}+a_1 \log I_{D1}/I_{01}+b_1(T_A-T_O)$$

and (3) $$V_{eb2}\approx V_{02}+a_2 \log I_{D2}/I_{02}+b_2(T_A-T_O)$$

The potential drop in the feedback loop includes the algebraic sum of Equations 2 and 3. Each of the definitions provided by Equations 2 and 3 include a term primarily dependent on temperature, i.e. $b(T_A-T_D)$. Transistors are quite easily matched for values of $b$ which is primarily a function of the semiconductor material from which the transistors are made. The transistors are then matched so that $b_1=b_2$, and for both transitsors, the terms $b(T_A-T_D)$ are identical. Because the transistors are of opposite conductivity, the voltage increment in $V_{eb1}$ due to this term is equal and opposite to the corresponding voltage increment in $V_{eb2}$ and the terms mutually cancel upon summation of Equations 2 and 3. In such instance, the sum of Equations 2 and 3 becomes (4)

$$V_{eb2}-V_{eb1}\approx V_{02}-V_{01}+a_2 \log I_{D2}/I_{02}-a_1 \log I_{D1}/I_{01}$$

The output voltage $e_o$ of the operational amplifier at terminal 30 is, of course, proportional to the feedback voltage, or (5)

$$e_o=K(V_{eb2}-V_{eb1})$$

Since we can define $$a_5=a_1\left(1+\frac{(a_2-a_1)}{a_1}\right)$$

then in view of Equation 5, Equation 4 can be rewritten as (6)

$$e_o\approx k\left\{(V_{02}-V_{01})+a_1 \log \frac{I_{01}}{I_{02}}+a_1 \log \frac{I_{D2}}{I_{D1}}+ (a_2-a_1) \log \frac{I_{D2}}{I_{02}}\right\}$$

A single substantially constant voltage term $V_K$ can be substituted in the above by noting that (7)

$$V_K=K\left((V_{02}-V_{01}+a_1 \log \frac{I_{01}}{I_{02}}\right)$$

Thus, substituting Equation 7 into Equation 6, (8)

$$e_o\approx K\left(V_K+a_1 \log \frac{I_{D2}}{I_{D1}}+(a_2-a_1) \log \frac{I_{D2}}{I_{02}}\right)$$

Current $I_x$ through resistor 28 due to input signal voltage $E_x$ applied at input terminal 26, is very nearly the same as the forward current $I_{D2}$ flowing in emitter 40 of transistor Q2. Transistor Q2 is selected such that its current amplification or $h_{fe}$ is quite high i.e. 50 or preferably greater than 100, over the maximum expected range of values of current $I_x$. Thus, $V_{eb1}$ is relatively independent of changes in the current $I_x$, because (where $h_{fe}$ for example is greater than 100) less than 1% of the current $I_{D2}$ need be drawn due to the joint action of transistor Q1 and the source of current $I_{ref}$.

The forward emitter current $I_{D1}$ of transistor Q1 is established primarily by the current $I_{ref}$ through resistor 50, and if the current $I_{ref}$ is established to be greater than the maximum value of the current $I_{D2}$, changes in the base current of transistor Q2 due to changes in the signal current $I_x$ will be quite negligible with respect to the magnitude of current $I_{D1}$. To a good approximation then, $I_{D1}$ can be considered a constant, K'.

Because the transistors are also preferably selected so that $$\frac{a_2-a_1}{a_{av.}}<0.01$$

where $$a_{av.}=\frac{a_2+a_1}{2}$$

then the last term of Equation 3 becomes negligible, and the transfer function now can be further simplified to (9)

$$e_o\approx a_1 \log \frac{I_{D2}}{K'}$$

The circuit of FIG. 1 also includes means for varying the slope of the transfer function by providing an arbitrarily selected coefficient for $e_o$. The passive network of resistors 32, 62, and 64 form a voltage divider or feedback attenuator which forces voltage $e_o$ to increase by a gain factor $\beta$ which is the ratio of the sum of the values of all of these resistors to the sum of the values of resistors 62 and 64 between the base of transistor Q1 and ground, i.e.

(10)

$$e_o\approx\beta\left(a_1 \log \frac{I_{D2}}{K'}\right)$$

Resistor 32, for example, is therefore preferably variable so that the aforesaid ratio can be readily changed. In addition, one of resistors 62 and 64, for example the latter, is of the type exhibiting a positive temperature coefficient. Typically, if transistors Q1 and Q2 are silicon transistors, resistor 64 is also of silicon and is selected to exhibit a temperature coefficient such as 0.7%/° C. which when the gain factor $\beta$ is otherwise established at an appropriate value, almost fully compensates for temperature variations in the value of $a_1$ in Equation 10. For this reason, resistor 64 is preferably positioned for simultaneous exposure to the same environment as the transistors as by being encapsulated together with them.

It will be apparent that as $a_1$ increases with temperature, the value of resistor 64 correspondingly increases and accordingly decreases the overall gain factor $\beta$. This tends to keep the slope $\beta a_1$ of the transfer function at a substantially constant value with respect to temperature.

While the voltage at the emitter of transistor Q2 is referenced to ground by virtue of the ground connection at input 22 of amplifier 20, the emitter voltage of transistor Q1 is established substantially by the current source comprising resistor 50 and battery 52. This would tend to float the emitter voltage, but the voltage applied to the base of transistor Q1 by potentiometer 54 references $V_{eb1}$ to ground. By adjusting contact 56 relative to resistance element 60, the voltage at base 34 of transistor Q1 can be shifted either positively or negatively. As the base voltage of transistor Q1 is thus shifted however, the voltage $V_{eb1}$ across the junction remains the same. The adjustment of the potentiometer thus sets an arbitrary output zero (i.e. controls translation of the coordinates of the transfer function) for the circuit of the invention. This allows the circuit to provide zero $e_o$ for an arbitrary value of $e_x$. Resistance 58 is preferably quite high, e.g. greater than the total value of resistor 32 in parallel with the sum of resistors 62 and 64 shunted by the input impedance of transistor Q1. This serves to minimize any interaction between the zero and gain adjustments.

Referring now to FIG. 2, there will be seen another embodiment of the present invention adapted to accept input signals of either polarity. Thus, amplifier 20 of FIG. 2 includes a pair of feedback loops, one of which is identical to that of FIG. 1 and includes, in series between the output and input summing junction of amplifier 20, variable resistor 32 and the base-emitter junctions of transistors Q1 and Q2. The emitter of transistor Q1 is coupled to a reference current source comprising resistor 50, and the base of transistor Q1 is connected to potentiometer 54 and also to a feedback attenuator comprising resistor 32 in series with resistor 62 and positive temperature-responsive resistor 64 to ground.

The other of the feedback loops includes, in series between the output and input summing junction of amplifier 20, variable resistor 72 and the base-emitter junctions of transistors Q3 and Q4. As is in both FIGS. 1 and 2 wherein transistors Q1 and Q2 are respectively npn and pnp transistors both in emitter-follower configuration, transistors Q3 and Q4 are respectively pnp and npn transistors also coupled as emitter-followers, and are selected with respect to one another as are transistors Q1 and Q2. Preferably transistors Q1 and Q4 are closely similar to one another, as are transistors Q2 and Q3. Appropriately poled bias sources are connected to the collectors of transistors Q4 and Q3. The latter also is provided with a reference current source comprising resistor 74 connected to the emitter of transistor Q3.

The base of transistor Q3 is, similarly to transistor Q1, connected to a bipolar potentiometer 76 substantially the same as potentiometer 54, and is also connected through variable resistor 72 to series resistors 78 and 80 (preferably identical with resistors 62 and 64 respectively) and thence to ground.

The embodiment of FIG. 2 functions in a manner differing from that of FIG. 1 only in that an output $e_o$ will appear at output terminal 30 for an input voltage $e_x$ of any polarity, whereas the circuit of FIG. 1 gives an output signal only for an input signal of only one polarity primarily.

Obviously, if the transistor pairs are selected such that Q1 and Q4 are identical, and Q2 and Q3 are identical, one feedback attenuator can serve both feedback loops. For example, resistors 72, 78, and 80 can be dispensed with, and the base of transistor Q3 connected directly to the base of transistor Q1. However, the provision of a separate attenuator for each feedback loop allows independent setting of the positive and negative slope of the transfer function.

Since certain changes may be made in the above apparatus without departing from the scope of the invention herein involved it is intended that all matter contained in the above description or shown in the accompanying drawing shall be interpreted in an illustrative and not in a limiting sense.

We claim:

1. A logarithmic amplifier comprising, in combination;

a high-gain inverting amplifier having an output terminal and input summing junction connected to a system input terminal through an input impedance;

a feedback loop between said output terminal and said summing junction, said loop including a series pair of base-emitter junctions of opposite polarity type transistors, each transistor having operating characteristics such that the base emitter voltage is substantially linear with respect to the logarithm of forward current therethrough, both transistors being mounted on a common heat sink;

a reference current source connected to said loop between said base-emitter junctions for providing to the base-emitter junction of the transistor coupled nearest said output terminal a constant forward current substantially greater than current flow through the base-emitter junction of the other of said transistors; and a feedback attenuator connected to said loop between said output terminal and said nearest transistor for adjusting the slope of the transfer function of said amplifier, said attenuator including a resistance element having a positive temperature characteristic similar to the temperature characteristic of the logarithmic coefficient of said other transistor.

2. A logarithmic amplifier comprising, in combination:

a high-gain inverting amplifier having an output terminal and an input summing junction connected to a system input terminal through an input impedance;

a feedback loop between said output terminal and said summing junction, said loop including a pair of junction transistors of opposite conductivity type in series emitter-follower configuration, at least the one transistor nearest said summing junction having a current amplification greater than 50, the temperature variable coefficients of the transfer functions of said transistors being substantially matched to one another;

means mounting said transistors in a common thermal environment;

a reference current source connected to said loop between said transistors for supplying a substantially constant current to the base-emitter circuit of the other of said transistors, which current constitutes the major portion of the forward current through said other transistor;

means connected to said loop between said output terminal and said other transistor for summing an arbitrary voltage referred to ground with the base-emitter voltage of said other transistor; and a feedback attenuator connected to said loop between said output terminal and said other transistor for increasing the closed loop gain of said amplifier and including a resistance element having a positive temperature characteristic similar to the temperature characteristic of the logarithmic coefficient of said one transistor.

3. A logarithmic amplifier comprising in combination:

a high-gain, inverting amplifier having an output terminal and an input summing junction connected to a system input terminal through an input impedance:

a feedback loop between said output terminal and said summing junction, said loop including a first three-termianl junction transistor of first conductivity type and being in emitter-follower configuration wherein its base is connected to said output terminal through a series feedback resistance; a substantially constant current source connected to the emitter of said first transistor;

a second three-terminal junction transistor of opposite conductivity type and being in emitter-follower configuration wherein the base of said second transistor is connected to the emitter of said first transistor, the emitter of said second transistor being connected to said summing junction; the thermally responsive characteristics of said transistors being matched to one another;

a resistive impedance connected in series between the base of said first transistor and ground, and comprising an element having a positive thermal coefficient of resistance.

4. An amplifier as defined in claim 3 including potentiometric means for providing an arbitrarily variable voltage and connected to the base of said first transistor.

5. An amplifier as defined in claim 3 wherein the current gain of each of said transistor is greater than 50.

6. An amplifier as defined in claim 3 wherein said transistors and said element are disposed so as to be exposed to substantially the same thermal environment.

7. An amplifier as defined in claim 3 wherein said series feedback resistance is arbitrarily variable.

8. An amplifier as defined in claim 3 wherein the gain of said second transistor and said reference current are selected in view of the maximum expected input or signal current through said system input terminal so that less than 1% of the forward current through said first transistor is derived other than from said reference current.

9. A logarithmic amplifier comprising in combination:

a high-gain, inverting amplifier having an output terminal and an input summing junction connected to a system input terminal through an input impedance:

a first feedback loop between said output terminal and said summing junction, said loop including a first three-terminal junction transistor of first conductivity type and being in emitter-follower configuration wherein its base is connected to said output terminal through a first series feedback resistance and a second three-terminal junction transistor of opposite conductivity type and being in emiter-follower configuration wherein the base of said second transistor is connected to the emitter of said first transistor, the emitter of said second transistor being connected to said summing junction;

a second feedback loop between said output terminal and said summing junction, said loop including a third three-terminal junction transistor of said opposite conductivity type and being in emitter-follower configuration wherein its base is connected to said output terminal through a second series feedback resistance, and a fourth three-terminal junction transistor of said first conductivity type and being in emitter-follower configuration wherein the base of said fourth transistor is connected to the emitter of said third transistor, the emitter of said fourth transistor being connected to said summing junction;

means for providing substantially constant current and connected to the emitters of said first and third transistors; and resistive impedance means connecting the bases of said first and third transistors to ground and having a positive thermal coefficient of resistance;

said transistors and said impedance means all being disposed for exposure to substantially the same thermal environment.

10. A logarithmic amplifier as defined in claim 9 including a first feedback attenuating network connected to the base of said first transistor, and a second feedback attenuating network connected to the base of said third transistor.

No references cited.

ARTHUR GAUSS, *Primary Examiner.*

R. H. EPSTEIN, *Assistant Examiner.*